United States Patent
Tamura et al.

(10) Patent No.: US 9,771,105 B2
(45) Date of Patent: Sep. 26, 2017

(54) SUSPENSION STRUCTURE FOR IN-WHEEL MOTOR DRIVE DEVICE

(71) Applicant: NTN Corporation, Osaka-shi, Osaka (JP)

(72) Inventors: Shiro Tamura, Shizuoka (JP); Minoru Suzuki, Shizuoka (JP)

(73) Assignee: NTN CORPORATION, Osaka (JP)

(*) Notice: Subject to any disclaimer, the term of this patent is extended or adjusted under 35 U.S.C. 154(b) by 0 days.

(21) Appl. No.: 14/427,746

(22) PCT Filed: Sep. 2, 2013

(86) PCT No.: PCT/JP2013/073540
§ 371 (c)(1),
(2) Date: Mar. 12, 2015

(87) PCT Pub. No.: WO2014/042030
PCT Pub. Date: Mar. 20, 2014

(65) Prior Publication Data
US 2015/0203159 A1 Jul. 23, 2015

(30) Foreign Application Priority Data
Sep. 12, 2012 (JP) ................................. 2012-200843

(51) Int. Cl.
B60K 7/00 (2006.01)
B62D 21/11 (2006.01)
(Continued)

(52) U.S. Cl.
CPC ............ B62D 21/11 (2013.01); B60G 21/051 (2013.01); B60K 7/0007 (2013.01);
(Continued)

(58) Field of Classification Search
CPC B60K 7/00; B60K 7/0007; B60K 2007/0092; B60K 1/00; B60K 2001/001;
(Continued)

(56) References Cited

U.S. PATENT DOCUMENTS 3,937,291 A * 2/1976 Hanagan .................. B60K 1/00
180/220
5,366,238 A * 11/1994 Stephens ................ B60G 7/001
267/31

(Continued)

FOREIGN PATENT DOCUMENTS

DE 102011005625 A1 * 9/2012 .......... B60K 7/0007
JP 08-127211 5/1996
(Continued)

Primary Examiner — J. Allen Shriver, II
Assistant Examiner — Steve Clemmons
(74) Attorney, Agent, or Firm — Clark & Brody

(57) ABSTRACT

A suspension structure includes a pair of trailing arms (12), a beam member (13) connecting the pair of trailing arms, a bracket (21) connected to a rear end region of the trailing arm, and an in-wheel motor drive device (31) coupled and fixed to the bracket. The in-wheel motor drive device (31) is located above the rear end region of the trailing arm (12), and a lower side of the in-wheel motor drive device (12) is covered by the rear end region of the trailing arm (12) and the bracket (21).

4 Claims, 5 Drawing Sheets

(51) Int. Cl.
*B60G 21/05* (2006.01)
*B60K 17/04* (2006.01)

(52) U.S. Cl.
CPC .... *B60G 2200/21* (2013.01); *B60G 2200/422* (2013.01); *B60G 2204/182* (2013.01); *B60G 2300/50* (2013.01); *B60K 17/043* (2013.01); *B60K 2007/0038* (2013.01); *B60K 2007/0092* (2013.01)

(58) Field of Classification Search
CPC .............. B60G 21/051; B60G 2200/21; B60G 2200/422; B60G 2204/182; B60G 2300/50; B62D 21/11; B62M 7/12
See application file for complete search history.

(56) References Cited

U.S. PATENT DOCUMENTS

| | | | | |
|---|---|---|---|---|
| 5,524,726 | A * | 6/1996 | Wright, Jr. | B62K 11/10 180/220 |
| 5,924,504 | A * | 7/1999 | Ruppert, Jr. | B60K 1/02 180/349 |
| 6,722,459 | B1 * | 4/2004 | Wendl | B60K 7/0007 180/65.51 |
| 7,501,732 | B2 * | 3/2009 | Usami | H02K 5/10 310/88 |
| 8,251,167 | B2 * | 8/2012 | Moriguchi | B60K 7/0007 180/65.51 |
| 8,857,545 | B2 * | 10/2014 | Lee | B60K 7/0007 180/242 |
| 2006/0087182 | A1 * | 4/2006 | Sugiyama | B60K 7/0007 310/75 C |
| 2008/0018064 | A1 * | 1/2008 | Martin | B60G 17/017 280/6.152 |
| 2009/0038865 | A1 | 2/2009 | Moriguchi et al. | |
| 2009/0078528 | A1 * | 3/2009 | Uzawa | B60K 7/0007 192/12 D |
| 2011/0132673 | A1 | 6/2011 | Kim | |
| 2012/0292978 | A1 * | 11/2012 | Buschjohann | B60G 21/051 301/6.5 |
| 2015/0210154 | A1 * | 7/2015 | Tamura | B60K 7/0007 180/55 |

FOREIGN PATENT DOCUMENTS

| | | |
|---|---|---|
| JP | 2002-337554 | 11/2002 |
| JP | 2002337554 A * | 11/2002 |
| JP | 2005153557 A * | 6/2005 |
| JP | 2005-324722 | 11/2005 |
| JP | 2005-335514 | 12/2005 |
| JP | 2006-027310 | 2/2006 |
| JP | 2006-062476 | 3/2006 |
| JP | 2007-099114 | 4/2007 |
| JP | 2010-069963 | 4/2010 |
| JP | 2010-116017 | 5/2010 |
| JP | 2010-228544 | 10/2010 |
| WO | 2010/034807 | 4/2010 |

* cited by examiner

SUSPENSION STRUCTURE FOR IN-WHEEL MOTOR DRIVE DEVICE

TECHNICAL FIELD

The present invention relates to suspension devices that attach an in-wheel motor drive device to a vehicle body.

BACKGROUND ART

Trailing arm suspension devices are widely used as suspension devices for vehicles. Torsion beam suspension devices in which right and left trailing arms are connected by a cross beam (also called "torsion beam") are advantageous in terms of cost, and are used for rear wheels of small cars. A trailing arm suspension device described in Japanese Unexamined Patent Application Publication No. H08-127211 (Patent Literature 1) is known as an example of such trailing arm suspension devices. In the trailing arm suspension device of Patent Literature 1, a spindle for attaching a wheel is provided at the rear end of each trailing arm. This spindle protrudes outward in the lateral direction of a vehicle.

In recent years, many in-wheel motor drive devices have been proposed in which a motor is placed in an inner space region of a road wheel of a wheel to drive the wheel with this motor. For example, suspension devices described in Japanese Unexamined Patent Application Publication Nos. 2010-116017 (Patent Literature 2) and 2006-27310 (Patent Literature 3) are known as suspension devices that include trailing arms and suspend in-wheel motor drive devices. In the suspension device of Patent Literature 2, each in-wheel motor drive device is placed inward of the trailing arm in the lateral direction of a vehicle. In the suspension device of Patent Literature 3, each in-wheel motor drive device is placed outward of the trailing arm in the lateral direction of a vehicle.

CITATION LIST

Patent Literatures

PTL 1: Japanese Unexamined Patent Application Publication No. H08-127211
PTL 2: Japanese Unexamined Patent Application Publication No. 2010-116017
PTL 3: Japanese Unexamined Patent Application Publication No. 2006-27310

SUMMARY OF INVENTION

Technical Problem

The inventors found that the above conventional suspension devices have configurations to be improved. That is, in the configuration in which the in-wheel motor drive device is suspended by the trailing arm as in Patent Literatures 2 and 3, the most part of the lower surface of the in-wheel motor drive device faces the ground. Accordingly, stones thrown up from the road may hit the in-wheel motor drive device, or the in-wheel motor drive device may hit bumps on the road.

In view of the above, it is an object of the present invention to provide a suspension structure capable of protecting an in-wheel motor drive device from bumps on the road, stones from the road, etc.

Solution to Problem

In order to achieve the above object, a suspension structure for an in-wheel drive device according to the present invention is a suspension structure for an in-wheel drive device, including a pair of trailing arms extending in a longitudinal direction of a vehicle and separated from each other in a lateral direction of the vehicle, each trailing arm having at its front end a pivot that is attached to a vehicle body, a beam member extending in the lateral direction of the vehicle and connecting the pair of trailing arms, a bracket connected to a rear end region of the trailing arm, and an in-wheel motor drive device coupled and fixed to the bracket, characterized in that the in-wheel motor drive device is located above the rear end region of the trailing arm, and a lower side of the in-wheel motor drive device is covered by the rear end region of the trailing arm and the bracket.

According to the present invention, since the lower surface of the in-wheel motor drive device is covered by the rear end region of the trailing arm and the bracket, the lower surface of the in-wheel motor drive device can be protected. Bumps on a road, stones from the road, etc. can therefore be prevented from hitting the lower surface of the in-wheel motor drive device.

In Patent Literatures 2 and 3, the in-wheel motor drive device is heavier than a wheel, and an excessive bending moment is therefore applied to a trailing arm 101 as shown by arrow in FIGS. 9 and 10. According to the present invention, since the position of the in-wheel motor drive device in the lateral direction of the vehicle can be selected in a preferable manner by the bracket, the bending moment can be reduced. Moreover, since the in-wheel motor drive device is coupled and fixed to the trailing arm via the bracket, the shape of the trailing arm and the shape of the in-wheel motor drive device can be designed with more flexibility.

The shape of the bracket is not particularly limited. However, in an embodiment of the present invention, the bracket is formed by a plate material, and includes a projecting wall portion projecting outward in the lateral direction of the vehicle from the rear end region of the trailing arm and a vertical wall portion extending upward from the projecting wall portion. According to this embodiment, the protection of the lower surface of the in-wheel motor drive device can be implemented in a preferable manner.

In a preferred embodiment of the present invention, the projecting wall portion has a drain hole extending therethrough in a vertical direction. According to this embodiment, water, gravel, etc. can be prevented from gathering on the upper surface of the projecting wall portion.

In a preferred embodiment of the present invention, the rear end region of the trailing arm has, at a position in the longitudinal direction of the vehicle which is included in a range from a front end to a rear end of the bracket in the longitudinal direction of the vehicle, a coupling portion that is coupled to a lower end of a shock absorber extending from the vehicle body. According to this embodiment, the coupled portion between the shock absorber and the trailing arm can be located closer to the in-wheel motor drive device, which is advantageous in terms of layout of the suspension device. Moreover, vertical swinging of the in-wheel motor drive device can be effectively damped.

The trailing arm need only extend in the longitudinal direction of the vehicle, and the extending direction of the trailing arm is not particularly limited. The shape of the trailing arm in section is not particularly limited. The radial dimension of the in-wheel motor drive device is typically larger than the vertical dimension of the shape of the trailing arm in section. In a preferred embodiment of the present invention, the rear end region of the trailing arm extends linearly so as to be substantially horizontal, and a central region of the trailing arm extends in a gently tilted manner with respect to the rear end region such that a front end of the central region is higher than a rear end thereof. According to this embodiment, the in-wheel motor drive device can be attached to the trailing arm in a preferable manner in a small space between the vehicle body and the ground. Moreover, the central region of the trailing arm can cover a front surface of the in-wheel motor drive device, and the front surface of the in-wheel motor drive device can be protected from bumps on the road, stones from the road, etc.

Advantageous Effects of Invention

As described above, according to the present invention, in a suspension structure in which in-wheel motor drive devices are attached to trailing arms, the in-wheel motor drive devices can be protected from bumps on the road, stones from the road, etc. Accordingly, reliability and durability of the in-wheel motor drive devices can be improved while retaining advantages of trailing arm suspensions in terms of cost.

DESCRIPTION OF EMBODIMENTS

Figure 1:
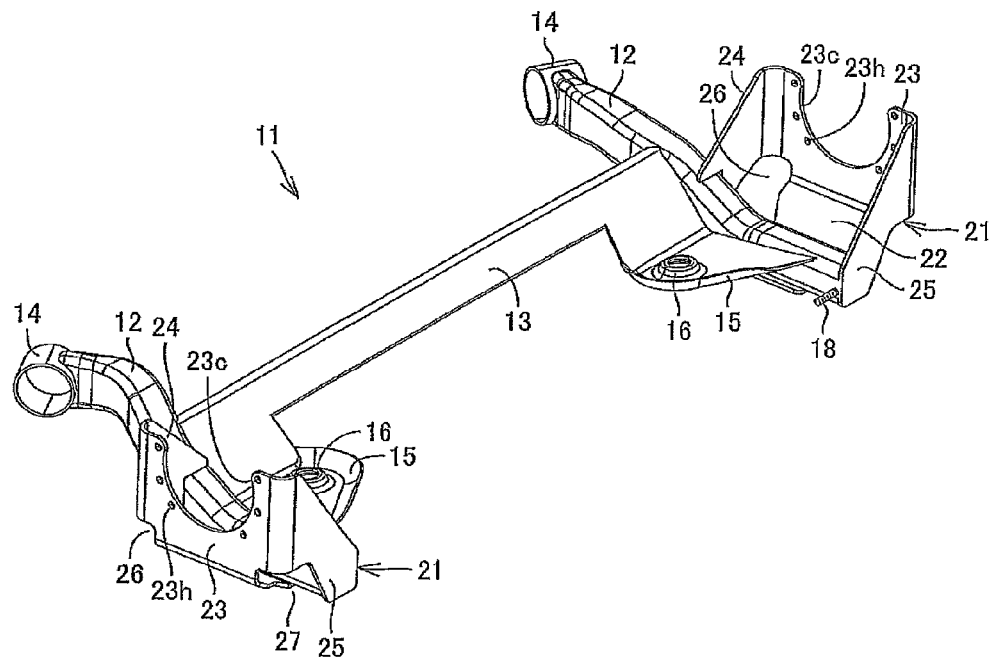
FIG. 1 is a perspective view showing a suspension structure for an in-wheel motor drive device according to an embodiment of the present invention.
Figure 2:
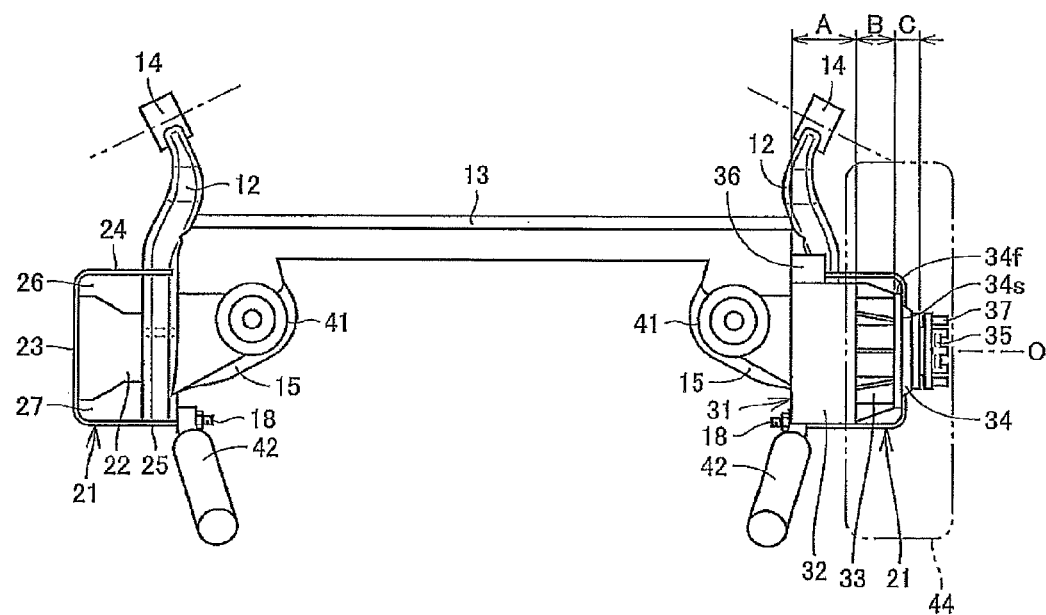
FIG. 2 is a plan view showing the suspension structure of the embodiment.
Figure 3:
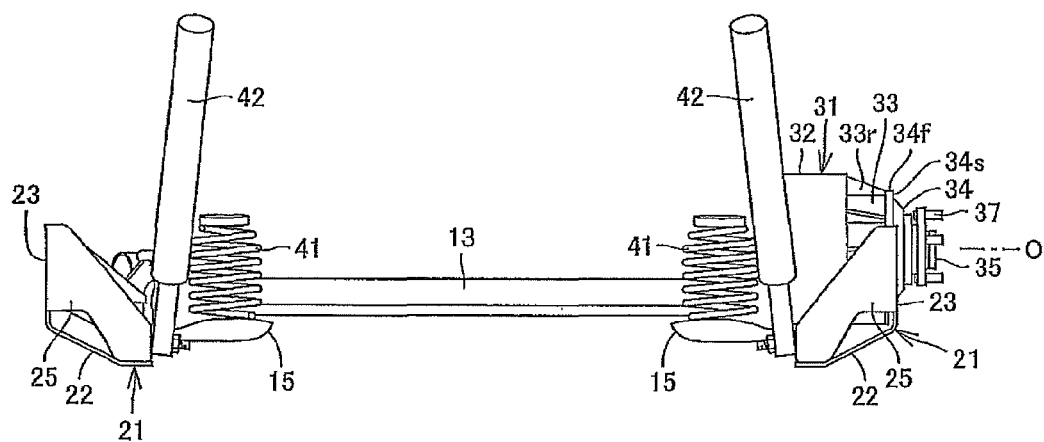
FIG. 3 is a rear view showing the suspension structure of the embodiment.
Figure 4:
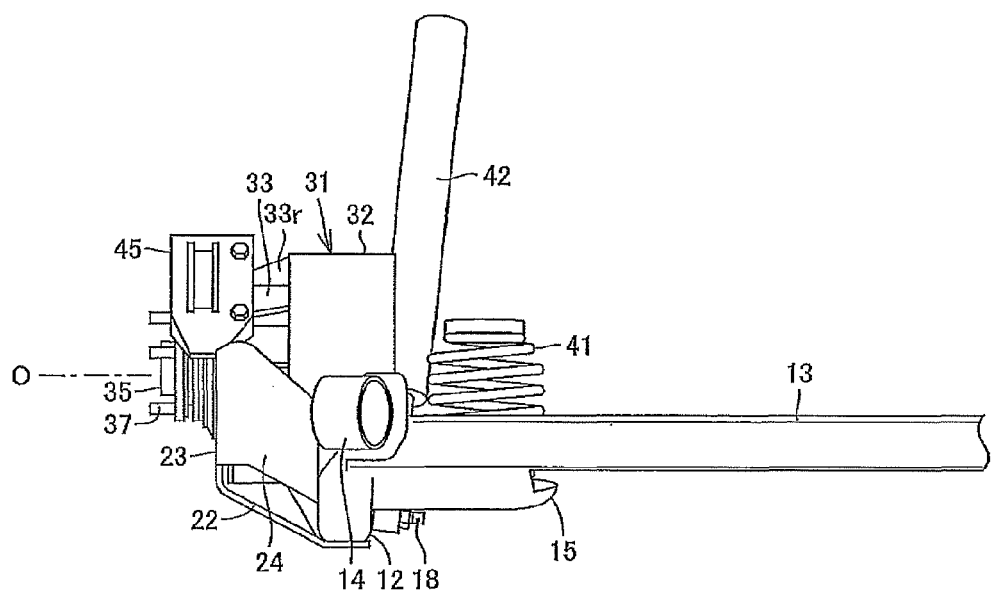
FIG. 4 is a front view showing a part of the suspension structure of the embodiment.
Figure 5:
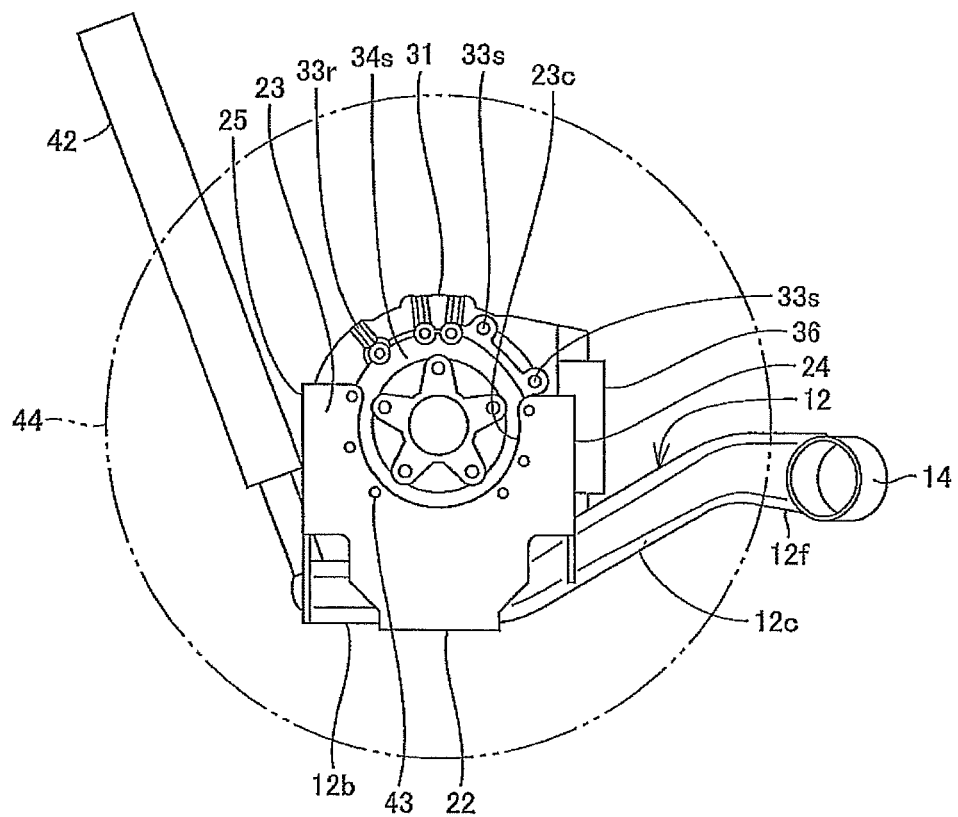
FIG. 5 is a side view showing the suspension structure of the embodiment.

An embodiment of the present invention will be described in detail below with reference to the accompanying drawings. FIG. 1 is a perspective view showing a suspension structure for an in-wheel motor drive device according to an embodiment of the present invention. In order to facilitate understanding, only main suspension members are shown in FIG. 1. FIG. 2 is a plan view showing the suspension structure of the embodiment. FIG. 3 is a rear view showing the suspension structure of the embodiment as viewed from the rear of a vehicle. In order to facilitate understanding, the in-wheel motor drive device on one trailing arm is omitted in FIGS. 2 and 3. FIG. 4 is a front view showing a part of the suspension structure of the embodiment as viewed from the front of the vehicle. FIG. 5 is a side view showing the suspension structure of the embodiment as viewed from outside in the lateral direction of the vehicle.

The suspension structure of the embodiment uses a torsion beam suspension member 11 that includes a pair of trailing arms 12 extending in the longitudinal direction of the vehicle and separated from each other in the lateral direction of the vehicle and a cross beam 13 disposed between the pair of trailing arms 12, 12 and extending in the lateral direction of the vehicle. Both ends of the cross beam 13 are connected to each of the trailing arm 12 respectively. The trailing arms 12 and the cross beam 13 are pipe members made of a metal. Both ends of the cross beam 13 are connected to central regions of the trailing arms 12. When a vehicle body, not shown, which is supported by the torsion beam suspension member 11 rolls and one of the trailing arms 12 swings differently from the other trailing arm 12, the cross beam 13 is twisted. The torsion beam suspension member 11 thus functions as a stabilizer.

Each trailing arm 12 has at its front end a pivot 14 that is attached to a member of the vehicle body. The pivot center of the pivot 14 extends in a tilted manner with respect to the lateral direction of the vehicle such that the inner side of the pivot center in the lateral direction of the vehicle is located forward of the outer side of the pivot center in the lateral direction of the vehicle, as shown by dot-and-dash lines in FIG. 2. The torsion beam suspension member 11 further includes spring lower seats 16 that receive the lower ends of coil springs 41, respectively. The spring lower seats 16 are respectively provided on plates 15 each provided rearward of the connection portion between the cross beam 13 and a corresponding one of the trailing arms 12 so as to adjoin this connection portion. Each plate 15 is formed by bending and forming a metal plate. Each plate 15 is connected to the central and rear end regions of a corresponding one of the trailing arms 12, and is connected to a corresponding one of the ends of the cross beam 13.

Each coil spring 41 is a component of a suspension device, and serves as a spring that reduces swinging of a corresponding one of the trailing arms 12 about the pivot 14. The lower end of the coil spring 41 is supported by the spring lower seat 16 at a position inward of the rear end region of the trailing arm 12 in the lateral direction of the vehicle. The upper end of the coil spring 41 supports a vehicle body member, not shown.

Each trailing arm 12 has at its rear end a coupling portion 18 that is coupled to the lower end of a corresponding one of shock absorbers 42. The trailing arm 12 is coupled to the lower end of the shock absorber 42 via this coupling portion 18. Each shock absorber 42 is a component of the suspension device, and serves as a damper that damps swinging of a corresponding one of the trailing arms 12 about the pivot 14. The upper end of the shock absorber 42 supports a vehicle body member, not shown.

As shown in FIG. 5, the rear end region 12b of the trailing arm 12 extends linearly so as to be substantially horizontal. The central region 12c of the trailing arm 12 extends in a gently tilted manner with respect to the rear end region 12b such that the front end of the central region 12c is higher than the rear end thereof. A front end region 12f of the trailing arm 12 is located higher than the rear end region 12b and extends linearly so as to be substantially horizontal.

An in-wheel motor drive device 31 is coupled and fixed to the rear end region of each trailing arm 12. The in-wheel motor drive device 31 has a motor unit 32, a reduction gear unit 33, and a hub unit 34, and is coupled and fixed to a bracket 21 attached to the trailing arm 12 in such an attitude that a hub shaft 35 that is rotatably supported by the hub unit 34 extends in the lateral direction of the vehicle. The tip end of the hub shaft 35 extends so as to protrude from the hub unit 34, and has a plurality of bolts 37 in order to couple to a road wheel of a wheel 44.

The motor unit 32, the reduction gear unit 33, and the hub unit 34 form a common rotation axis O. The motor unit 32, the reduction gear unit 33, and the hub unit 34 are arranged in this order as viewed in the direction of the rotation axis O. Each of the motor unit 32 and the reduction gear unit 33 includes a non-rotary casing. An outer peripheral member of the hub unit 34 corresponds to an outer ring of a bearing, and is connected to the casings of the motor unit 32 and the reduction gear unit 33. The hub shaft 35 that is rotatably supported by the outer peripheral member of the hub unit 34 is a rotary member extending along the rotation axis O. A terminal box 36 for power cables is formed on the front side of the casing of the motor unit 32.

The motor unit 32 has a generally cylindrical shape about the rotation axis O, and contains a rotor and a stator in the casing. The reduction gear unit 33 has a generally cylindrical shape about the rotation axis O, and contains, e.g., a cycloidal reduction gear mechanism in the casing. The reduction gear unit 33 reduces the speed of rotation input from the motor unit 32 and outputs the reduced rotation to the hub unit 34. The cycloidal reduction gear mechanism is smaller and lighter than a planetary gear reduction gear mechanism, and can reduce the speed of rotation input to less than 1/10. The cycloidal reduction gear mechanism is advantageous as a reduction gear mechanism of the in-wheel motor drive device.

The axial dimension A of the motor unit 32 is the dimension from the end face in the direction of the axis O of the motor unit 32 excluding protrusions such as screw heads to the boundary between the motor unit 32 and the reduction gear unit 33. The axial dimension B of the reduction gear unit 33 is the dimension from the boundary between the motor unit 32 and the reduction gear unit 33 to the boundary between the reduction gear unit 33 and the hub unit 34. The axial dimension C of the hub unit 34 is the dimension from the boundary between the reduction gear unit 33 and the hub unit 34 to the end face in the direction of the axis O of an outer ring portion of the hub unit 34 excluding the hub shaft 35. The axial dimension B is smaller than the axial dimension A, and the axial dimension C is smaller than the axial dimension B.

Regarding the radial dimensions, the radial dimension of the reduction gear unit 33 is smaller than that of the motor unit 32. The radial dimension of the hub unit 34 is smaller than that of the reduction gear unit 33. An outward flange 34f is formed on the reduction gear unit 33 side of the outer peripheral surface of the hub unit 34 to fill the gap formed by the difference in radial dimension between the reduction gear unit 33 and the hub unit 34. The outward flange 34f has an end face 34s. The end face 34s is perpendicular to the rotation axis O. A plurality of triangular ribs 33r are formed on the outer periphery of the reduction gear unit 33 at predetermined intervals in the circumferential direction. The triangular ribs 33r are also connected to the motor unit 32 to reinforce the connection between the motor unit 32 and the reduction gear unit 33 which have different radial dimensions from each other. Moreover, bolt holes 33s are formed in the outer periphery of the upper part of the reduction gear unit 33 in order to couple and fix a brake caliper 45.

The wheel 44 is a well-known wheel having a rubber tire attached to the outer periphery of the road wheel, and is fixed to the hub shaft 35 by the bolts 37. The reduction gear unit 33 and the hub unit 34 are thus completely accommodated in an inner space region of the wheel 44, as shown by the dimensions B and C in FIG. 2. As shown by the dimension A in FIG. 2, the outer portion in the direction of the axis O of the motor unit 32 is accommodated in the inner space region of the wheel 44, and the inner portion in the direction of the axis O of the motor unit 32 is located inward of the wheel 44 in the lateral direction of the vehicle.

The bracket 21 is connected to the rear end region of the trailing arm 12 by welding etc., and protrudes upward from the rear end region of the trailing arm 12. The in-wheel motor drive device 31 is coupled to the rear end region of the trailing arm 12 via the bracket 21, and is located above the rear end region of the trailing arm 12.

The bracket 21 is formed by a plate material made of a metal, and as shown in FIGS. 3 and 4, includes a projecting wall portion 22 projecting outward in the lateral direction of the vehicle from the rear end region of the trailing arm 12, a vertical wall portion 23 extending upward from the projecting wall portion 22, a front wall portion 24 bent at 90 degrees from the front edge of the vertical wall portion 23 so as to extend in the lateral direction of the vehicle and connected to the rear end region of the trailing arm 12, and a rear wall portion 25 bent at 90 degrees from the rear edge of the vertical wall portion 23 so as to extend in the lateral direction of the vehicle and connected to the rear end of the trailing arm 12. The vertical wall portion 23 is a wall extending vertical to the ground. The vertical wall portion 23 is perpendicular to the lateral direction of the vehicle.

A substantially semicircular cutout portion 23c extending downward is formed in the upper edge of the vertical wall portion 23. The peripheral edge of the cutout portion 23c extends in an arc shape, and matches the end face 34s of the hub unit 34 of the in-wheel motor drive device 31, as shown in FIG. 5. A plurality of through holes 23h are formed in the peripheral edge of the cutout portion 23c, and bolt holes are formed in the end face 34s at positions corresponding to the through holes 23h. A plurality of bolts 43 extending through the through holes 23h are tightened into the bolt holes of the end face 34s, whereby the in-wheel motor drive device 31 is coupled and fixed to the bracket 21.

The projecting wall portion 22 is located between the front wall portion 24 and the rear wall portion 25 as viewed in the vertical direction. A drain hole 26 extending through the bracket 21 in the vertical direction is formed between the front wall portion 24 and the projecting wall portion 22. A drain hole 27 extending through the bracket 21 in the vertical direction is formed between the projecting wall portion 22 and the rear wall portion 25. Rainwater, gravel, etc. does not collect on the upper surface of the projecting wall portion 22 due to the drain holes 26, 27.

In the present embodiment, the shock absorbers 42 are placed so that the in-wheel motor drive devices 31 are suspended advantageously in terms of layout. First, the positional relation between the bracket 21 and the coupling portion 18 in the longitudinal direction of the vehicle will be described. The coupling portion 18 for the shock absorber 42 is a protrusion protruding inward in the lateral direction of the vehicle from the rear end of the trailing arm 12, and is located forward of the rear wall portion 25 forming the rear end of the bracket 21 in the longitudinal direction of the vehicle. The position of the coupling portion 18 in the longitudinal direction of the vehicle is thus included in the range from the front wall portion 24 forming the front end of the bracket 21 to the rear wall portion 25 in the longitudinal direction of the vehicle. Accordingly, the coupled portion between the shock absorber 42 and the trailing arm 12 can be located closer to the in-wheel motor drive device 31, which makes it easier to place the torsion beam suspension member 11 below the vehicle body. Moreover, the shock absorber 42 can effectively damp vertical swinging of the in-wheel motor drive device 11.

In the present embodiment, as shown in FIG. 2, the coil spring 41 extending in the vertical direction is located close to the in-wheel motor drive device 31, and the position of the coil spring 41 in the longitudinal direction of the vehicle is included in the range from the front end to the rear end of the in-wheel motor drive device 31. The coil spring 41 can therefore effectively reduce vertical swinging of the trailing arm 12.

In the present embodiment, as shown in FIG. 2, the in-wheel motor drive device 31 is coupled and fixed to the rear end region of the trailing arm 12 so that the rotation axis O extends in the lateral direction of the vehicle. The position of the pivot 14 in the lateral direction of the vehicle is included in the axial dimension A, B, and C as the range from the inner end to the outer end of the in-wheel motor drive device 31 in the lateral direction of the vehicle. According to the present embodiment, the impact of the bending moment due to the in-wheel motor drive device 31 on the trailing arm 12 can be reduced.

In the present embodiment, the rear end region of the trailing arm 12 is located below the in-wheel motor drive device 31 and faces the lower surface of the in-wheel motor drive device 31. Since the rear end region of the trailing arm 12 thus covers the lower surface of the in-wheel motor drive device 31, the in-wheel motor drive device 31 can be protected from stones from the road and bumps on the road surface.

Since the lower surface of the in-wheel motor drive device 31 is covered by both the rear end region of the trailing arm 12 and the bracket 21, the above protection effect can be implemented in a preferable manner.

In the present embodiment, the end face 34s of the hub unit 34 is coupled and fixed to the vertical wall portion 23 of the bracket 21. Accordingly, the load of the vehicle supported by the road surface is transferred to the bracket 21 through the wheel 44, the hub shaft 35, and the hub unit 34, and the motor unit 32 and the reduction gear unit 33 do not transfer the load of the vehicle. The strength of the motor unit 32 and the reduction gear unit 33 therefore need not be increased, and the weight of the in-wheel motor drive device 31 can be reduced.

The power cable extending from the terminal box 36 is connected to the vehicle body, not shown. As in a modification shown in FIG. 6, the power cable may be disposed in the trailing arm 12 and the cross beam 13 and may be extended from the central part of the cross beam 13 and connected to the vehicle body.

Figure 6:
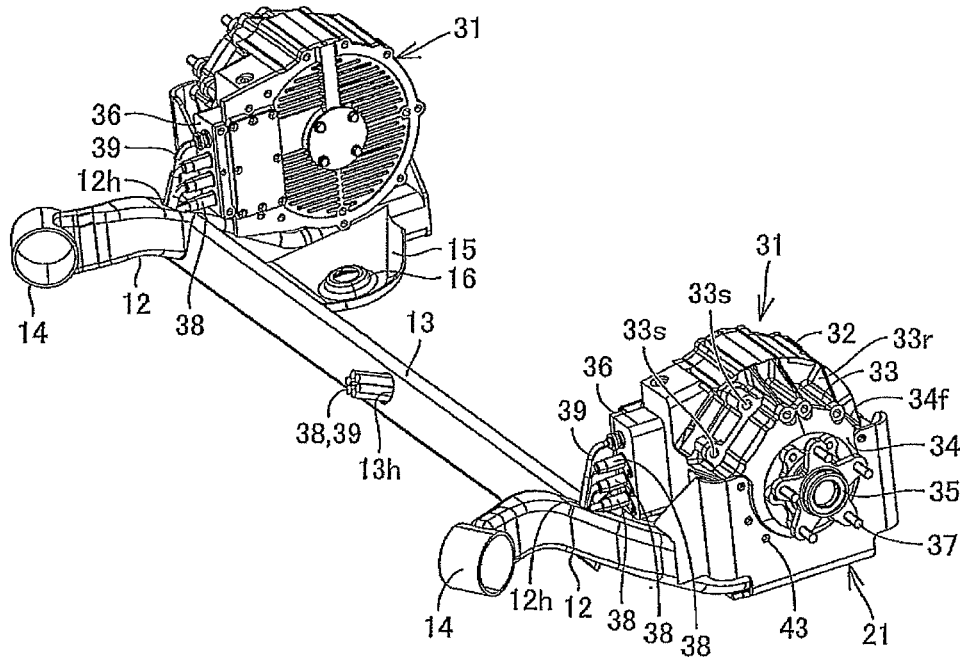
FIG. 6 is a perspective view showing a suspension structure of a modification.

The modification in FIG. 6 will be described in detail. A first opening 12h is formed in the central region of each trailing arm 12. The first opening 12h is formed in the upper surface of the trailing arm 12 at a position near the connection portion between the trailing arm 12 and the cross beam 13 so as to open upward. Three power cables 38 and one signal cable 39 which extend from the terminal box 36 extend in the torsion beam suspension member 11 through the first opening 12h. Although not shown in the figure, it is more preferable to provide a cover that covers the power cables 38 and the signal cable 39 from the terminal box 36 to the first opening 12h.

The trailing arm 12 having a hollow section communicates with the cross beam 13 having a hollow section, and the power cables 38 and the signal cable 39 are disposed in the cross beam 13. The cross beam 13 has a second opening 13h in its central region, and the power cables 38 and the signal cables 39 which extend from the pair of in-wheel motor devices 31 extend to the outside of the torsion beam suspension member 11 through the second opening 13h, and are connected to an inverter, not shown, which is provided in the vehicle body.

According to this modification, the power cables 38 and the signal cables 39 can be protected from stones from the road and bumps on the ground even if the power cables 38 and the signal cables 39 are located close to the ground. The cross beam 13 has a hollow section, and the power cables 38 and the signal cables 39 are disposed in the cross beam 13. Accordingly, the power cables 38 and the signal cables 39 which are connected to the pair of in-wheel motor drive devices 31 can be gathered in the cross beam 13. The cross beam 13 has the second opening 13h in its central region, and the power cables 38 and the signal cables 39 which extend from the pair of in-wheel motor drive devices 31 extend to the outside of the torsion beam suspension member 11 through the second opening 13h. The ends of the power cables 38 etc. can therefore be connected to the inverter provided in the central part of the vehicle body by a short path.

Figure 7:
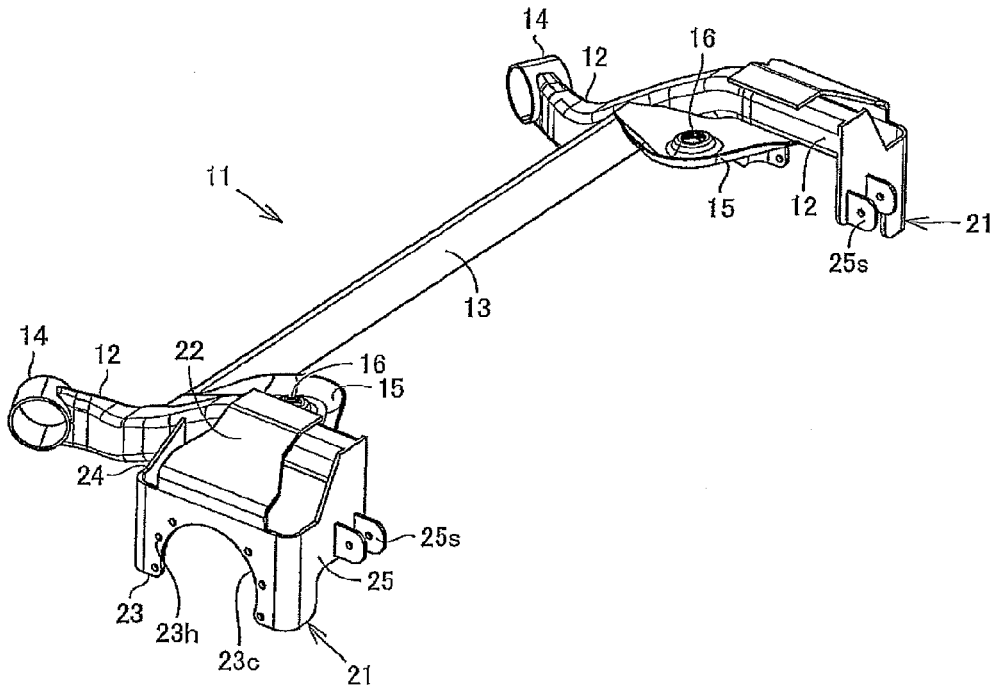
FIG. 7 is a perspective view showing a suspension structure according to another embodiment.

Other embodiments of the present invention will be described below. FIG. 7 is a perspective view showing a suspension structure according to another embodiment. In order to facilitate understanding, only trailing arms and a cross beam are shown in FIG. 7. Since the basic configuration as a trailing arm suspension device is the same as the above embodiment shown in FIGS. 1 to 5, description of the same portions will be omitted, and only the portions different from the above embodiment will be described below.

The embodiment of FIG. 7 is different from the above embodiment in that the rear end region of the trailing arm 12 is located above the in-wheel motor drive device 31 and faces the upper surface of the in-wheel motor drive device 31.

This will be described in detail below. As shown in FIG. 7, the bracket 21 includes a projecting wall portion 22 projecting outward in the lateral direction of the vehicle from the rear end of the trailing arm 12, and a vertical wall portion 23 extending downward from the projecting wall portion 22. The end face 34s of the in-wheel motor drive device 31 matches a cutout portion 23c of the vertical wall portion 23 thus extending downward beyond the rear end region of the trailing arm 12. Bolts are inserted through a plurality of bolt holes 23h formed at intervals in the peripheral edge of the cutout portion 23c, and the tip ends of the bolts are tightened into internally threaded portions formed in the end face 34s. The in-wheel motor drive device 31 is thus coupled and fixed to the bracket 21.

A coupling portion 25s that is coupled to the lower end of the shock absorber 42 is formed on the lower part of the rear wall portion 25. The coupling portion 25s is formed by a pair of tongues protruding from the rear wall portion 25 and facing each other. The coupling portion 25s receives the lower end of the shock absorber 42 between the pair of tongues.

The rear end region of the trailing arm 12 extends linearly so as to be substantially horizontal. The central region of the trailing arm extends in a gently tilted manner with respect to the rear end region thereof such that the front end of the central region is lower than the rear end thereof. The front end region of the trailing arm 12 is located lower than the rear end region thereof and extends linearly so as to be substantially horizontal.

In the embodiment of FIG. 7, the bracket 21 protrudes downward from the rear end region of the trailing arm 12. The in-wheel motor drive device is therefore placed below the rear end region of the trailing arm 12. In this embodiment as well, the position of the pivot 14 in the lateral direction of the vehicle is included in the axial dimension A, B, and C as the range from the inner end to the outer end of the in-wheel motor drive device 31 in the lateral direction of the vehicle. Accordingly, the bending moment that is applied to the trailing arm 12 can be reduced even if the in-wheel motor drive device 31 is heavy.

Figure 8:
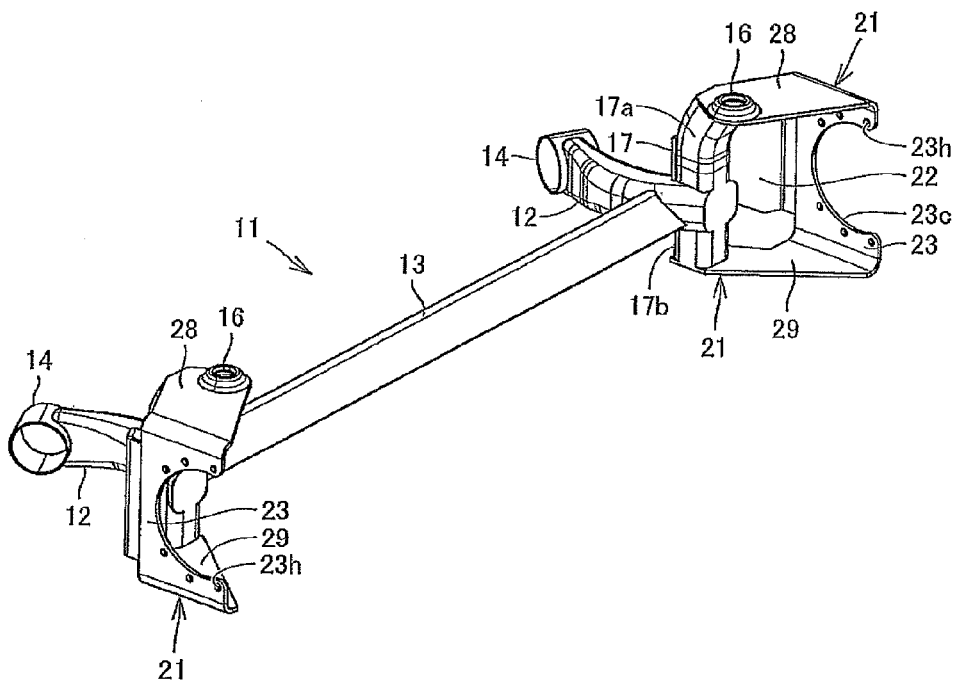
FIG. 8 is a perspective view showing a trailing arm suspension device according to still another embodiment.
Figure 9:
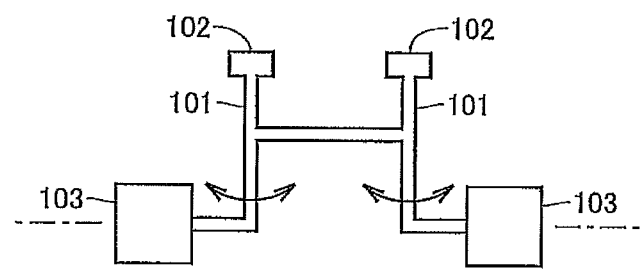
FIG. 9 is a plan view schematically showing a bending moment that is applied to conventional trailing arms.
Figure 10:
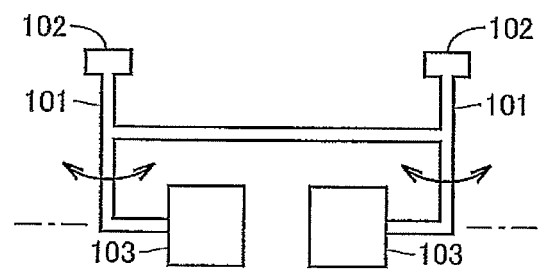
FIG. 10 is a plan view schematically showing a bending moment that is applied to conventional trailing arms.

Still another embodiment of the present invention will be described below. FIG. 8 is a perspective view showing a suspension structure according to still another embodiment. In order to facilitate understanding, only trailing arms and a cross beam are shown in FIG. 8. Since the basic configuration as a trailing arm suspension device is the same as the above embodiment shown in FIGS. 1 to 5, description of the same portions will be omitted, and only the portions different from the above embodiment will be described below.

In the embodiment shown in FIGS. 1 to 5 and the embodiment shown in FIG. 7, the position of the in-wheel motor drive device in the longitudinal direction of the vehicle body is included in the range of the dimension of the rear end region of the trailing arm 12 in the longitudinal direction of the vehicle body. The embodiment shown in FIG. 8 is different from the above embodiments in that the in-wheel motor drive device is located rearward of the rear end of the trailing arm 12.

This will be described in detail below. As shown in FIG. 8, the trailing arm 12 includes a reinforcing member 17 connected to the rear end of the trailing arm and extending in the vertical direction. The reinforcing member 17 is a pipe member having substantially the same shape in section as the trailing arm 12, and includes an upper portion 17a extending upward from the rear end of the trailing arm and a lower portion 17b extending downward from the rear end of the trailing arm. The trailing arm 12 except for the reinforcing member 17 extends horizontally.

The bracket 21 includes a projecting wall portion 22 projecting outward in the lateral direction of the vehicle from the reinforcing member 17, a vertical wall portion 23 extending rearward from the projecting wall portion 22, an upper wall portion 28 bent at 90 degrees from the upper edge of the vertical wall portion 23 so as to extend in the lateral direction of the vehicle and connected to the upper end of the reinforcing member 17, and a lower wall portion 29 bent at 90 degrees from the lower edge of the vertical wall portion 23 so as to extend in the lateral direction of the vehicle and connected to the lower end of the reinforcing member 17. The vertical wall portion 23 is vertical to the ground and perpendicular to the lateral direction of the vehicle. The upper wall portion 28 and the lower wall portion 29 are substantially horizontal. A cutout 23c extending forward is formed in the rear edge of the vertical wall portion 23. A spring lower seat 16 is formed on the upper surface of the upper wall portion 28. The spring lower seat 16 is located at the upper end of the reinforcing member 17.

In the embodiment of FIG. 8, the bracket 21 protrudes rearward of the rear end of the trailing arm 12. The in-wheel motor drive device is thus located rearward of the rear end of the trailing arm 12. In this embodiment as well, the position of the pivot 14 in the lateral direction of the vehicle is included in the axial dimension A, B, and C as the range from the inner end to the outer end of the in-wheel motor drive device 31 in the lateral direction of the vehicle. Accordingly, the bending moment that is applied to the trailing arm 12 can be reduced even if the in-wheel motor drive device 31 is heavy.

Although the embodiments of the present invention are described above with reference to the drawings, the present invention is not limited to the illustrated embodiments. Various modifications and variations can be made to the illustrated embodiments within a scope that is the same as, or equivalent to, that of the present invention.

INDUSTRIAL APPLICABILITY

The suspension structure for the in-wheel motor drive device according to the present invention is advantageously used in electric and hybrid vehicles.

REFERENCE SIGNS LIST

11 Torsion Beam Suspension Member
12 Trailing Arm
13 Cross Beam
14 Pivot
16 Spring Lower Seat
17 Reinforcing Member
18 Coupling Portion
21 Bracket
22 Projecting Wall Portion
23 Vertical Wall Portion
24 Front Wall Portion
25 Rear Wall Portion
26, 27 Drain Hole
28 Upper Wall Portion
29 Lower Wall Portion
31 In-Wheel Motor Drive Device
32 Motor Portion
33 Reduction Gear Unit
34 Hub Unit
34s End Face
35 Hub Shaft
36 Terminal Box
38 Power Cable
39 Signal Cable

The invention claimed is:

1. A suspension structure for an in-wheel drive device, including
a pair of trailing arms extending in a longitudinal direction of a vehicle and separated from each other in a lateral direction of said vehicle, each trailing arm having at its front end a pivot that is attached to a vehicle body,
a beam member extending in said lateral direction of said vehicle and connecting said pair of trailing arms,
a bracket connected to a rear end region of said trailing arm, and
an in-wheel motor drive device coupled and fixed to said bracket, the in-wheel motor drive device including a motor unit and a hub unit, characterized in that
said in-wheel motor drive device is located above said rear end region of said trailing arm, and a lower side of said in-wheel motor drive device is covered by said rear end region of said trailing arm and said bracket, wherein
said bracket is formed by a plate material, and includes a projecting wall portion projecting outward in said lateral direction of said vehicle from said rear end region of said trailing arm and a vertical wall portion extending upward from said projecting wall portion, said bracket further comprising a front wall portion extending from a front edge of the vertical wall portion in said lateral direction of the vehicle and connected to the rear end region of the trailing arm, and a rear wall portion extending from a rear edge of the vertical wall portion in the lateral direction of the vehicle and connected to the rear end of the trailing arm, the lower side of said in-wheel motor drive device including the motor unit and the hub unit is covered by said rear end region of said trailing arm, said projecting wall portion, and said vertical wall portion of said bracket, and said in-wheel motor drive device is coupled to and fixed to said vertical wall portion of said bracket, wherein the in-wheel motor drive device is protected from damage by the covering of the lower side thereof by said rear end region of said trailing arm, said projecting wall portion and said vertical wall portion.

2. The suspension structure according to claim 1, wherein said projecting wall portion has a drain hole extending therethrough in a vertical direction.

3. The suspension structure according to claim 1, wherein said rear end region of said trailing arm has, at a position in said longitudinal direction of said vehicle which is included in a range from a front end to a rear end of said bracket in said longitudinal direction of said vehicle, a coupling portion that is coupled to a lower end of a shock absorber extending from said vehicle body.

4. The suspension structure according to claim 1, wherein said rear end region of said trailing arm extends linearly so as to be substantially horizontal, and a central region of said trailing arm extends in a tilted manner with respect to said rear end region such that a front end of said central region is higher than a rear end thereof.

* * * * *